CONNECTION LAYOUT FOR A TELEPHONE INSTALLATION WITH KEYS
Filed May 11, 1964
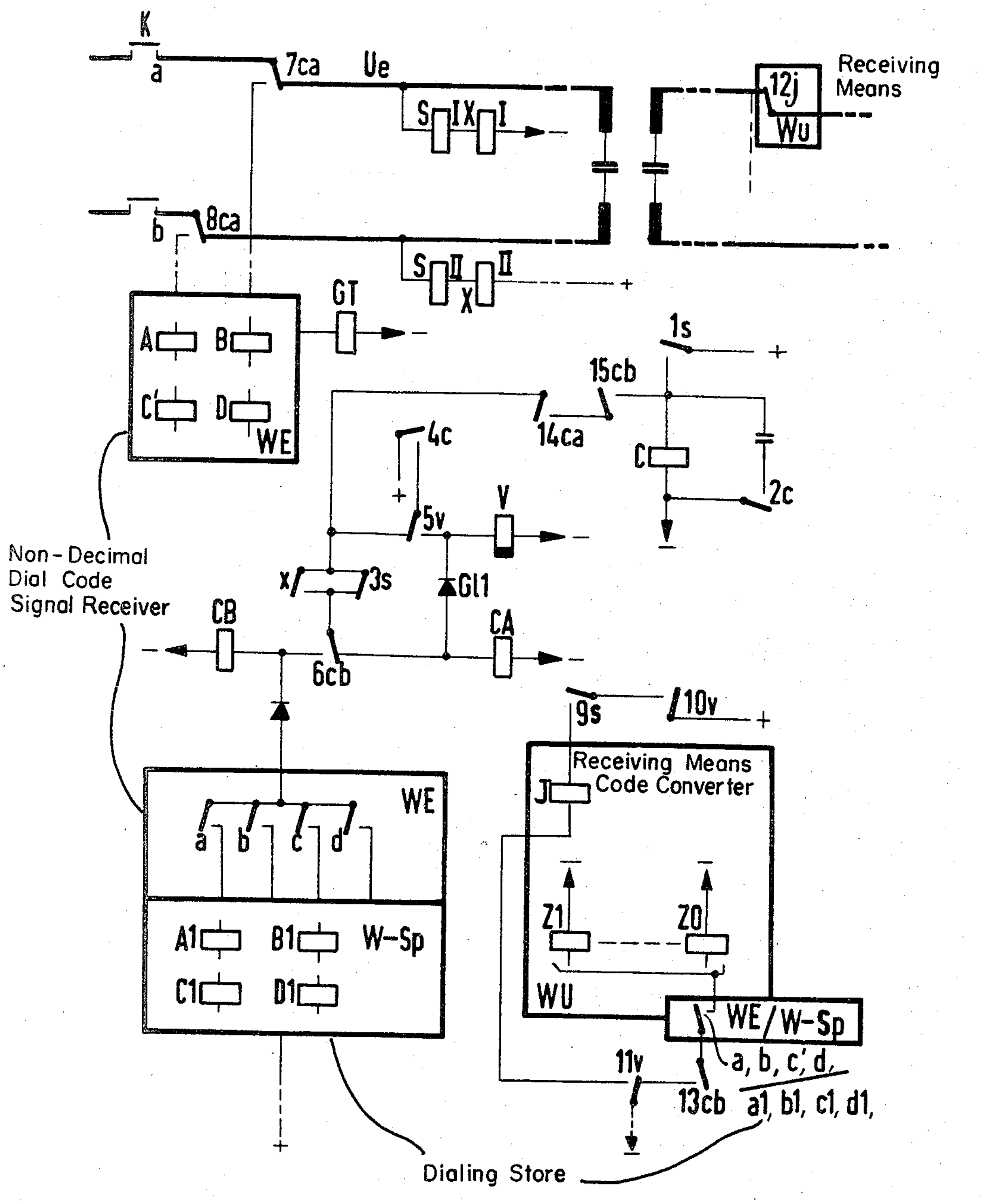

3,376,391
CONNECTION LAYOUT FOR A TELEPHONE INSTALLATION WITH KEYS
Dieter Finkhaüser, Unterpfaffenhofen, and Guenther Massow, Munich, Germany, assignors to Siemens Aktiengesellschaft, Munich, Germany
Filed May 11, 1964, Ser. No. 366,275
Claims priority, application Germany June 7, 1963, S 85,581
4 Claims. (Cl. 179—16)

ABSTRACT OF THE DISCLOSURE

The disclosure concerns an arrangement to permit use of the same repeater for both code and decimal dialing pulses, in telephone signalling systems. For this purpose a receiver circuit responsive to code dialing pulses is connected to the subscriber's line when the subscriber loop is completed, but time delay relay means is operative to interrupt that connection if a signal indicative of code dialing is not received within a short period of time. The circuit arrangement also includes relay means for supplying decimal dialing pulses directly to the outgoing connection from the repeater, under the control of the time delay means, when the code dialing signal is not received.

This invention concerns a connection arrangement or layout for a telephone installation which is provided with keys for code dialing stations and dial switches for pulse dialing stations, wherein the method of operation at either type of subscriber station is characterized by pulse current transmission.

A previously known connection arrangement wherein both stations having keys for code dialing and stations having dial switches for decimal pulse dialing could be connected together employed different transmission devices or repeaters for the making of signalling connections. In this scheme the stations having keys for code dialing can only complete connections through transmission devices provided with receiving arrangements for a code/decode converter. Also, an exchange transmission from a station having keys for code dialing can only be covered by such a special transmission device.

Another previously known device comprises a centrally-regulated telephone installation wherein the different types of subscriber stations are connected either with a dial signal receiver for code dialing, or with a current pulse receiver for decimal pulse dialing, for the purpose of covering an outgoing telephone connection, such connection being made in accordance with the resistance value of the speaking loop.

A further known arrangement involves the switching-on of the dial signal receiver for key dialing through loop current reduction. If there is no loop current reduction, the dial signal receiver is guided to decimal dialing. For these known arrangements, special demands exist for the calling and missing current values of the switching agents.

It has already been suggested that the type of service of a subscriber's station in a covered transmission be designated by switching on a transmission relay through an individual wiring and coupling point arrangement combining the calling station with the transmission device. This relay then controls the switching-off of the receiving means for the dial signals of stations of the opposite type of service and the switching on of the dial receiver for the dial signals of the calling station.

The purpose of this invention is to make current pulse transmission devices accessible to calling stations having dial switches for impulse signalling, as well as to calling signals having keys for code dialing, in an existing installation having dial switches for stations with decimal pulse dialing, and to adapt this transmission device in a simple manner to the given type of service.

In this invention a feeding point relay is controlled by decimal dial pulses transmitted from a speaking station with a dial switch, as well as by pre-dialing signals sent by a speaking station provided with keys, and through this relay the decimal dial pulses are permitted to be switched through a feeding point relay to a receiving installation only after time for receipt of a coded dial signal.

Thus it is possible, without special subscriber's signalling means, and without the use of special coupling points, to signal and control the method of treatment of transmissions from the calling station. This purpose is accomplished by utilization of means attached to the dial signal receiver which receives the coded dial signal.

The drawing shows one example for the execution of the invention, together with the important details necessary for understanding it. It is assumed that transmission device *Ue* can be connected over switch K to calling stations having dial switches as well as to calling stations having code keys.

The relay S is shown in the drawing as having two windings I and II which are respectively connected in series between the two conductors of the transmission circuit *Ue* and the opposite terminals of the battery. These coils are connected in series aiding arrangement, but the coils I and II of the relay X are connected in series opposing arrangement. As a result, when the transmission device *Ue* is seized, as by connecting a bridge across the lines *a* and *b* at the calling station, the relay S is energized, but the balanced or differential relay X is not energized.

Energization of relay S causes the relay C to be energized, by completion of a circuit through contact 1*s* of relay S. If the connection were from a subscriber's station having a dial switch, and the subscriber at that station were to send decimal pulses to the transmission device through operation of the dial switch, the relay S would be switched on and off with the rhythmic pulses. In such case it is not desired that the relay C be de-energized each time the relay S is opened, so that a capacitive delay circuit is connected in shunt with the relay C. The time delay furnished by the capacitor is long enough so that the relay C remains energized in the time intervals between pulses supplied by the dial switch.

An energizing circuit is formed for a delayed operation relay V through contact 3*s*, in its de-energized position as shown. This circuit is as follows:

(1) +, 4*c*, 5*v*, 3*s*, 6*cb*, *Gl*1, V, —.

The relays CA and CB are intended to control the operation of the dial code signal receiver WE and the transmission device or repeater *Ue*. The operating circuit for the relay CA includes the following elements:

(2) +, 4*c*, 5*v*, 3*s*, 6*cb*, CA, —

With the relay CA energized, the contacts 7*ca* and 8*ca* connect the speaking path directly to the dial receiving circuit WE.

If the coded dial signal indicating the use of keys at the subscriber's station is not received during the time delay before operation of relay V (for example 30 milliseconds), the relay CB remains de-energized. Then, at the end of the time delay, the relay V operates over the circuit including the rectifier Gl1, thus closing the front contacts 5v. The circuit (2) for energization of relay CA is therefore interrupted, and the rectifier Gl1 is poled so as to prevent continued energization of relay CA through the back contacts 5v. Relay CA therefore de-energizes.

The voice connections or leads *a* and *b* are therefore switched back through the contacts 7ca and 8ca to the current impulse receiver relay S, and the relay S pulses in dial pulse rhythm with the received decimal pulses. Since the relay V is energized at this time, the contacts 10v and 11v complete an energizing circuit for the relay J in the receiving means WU, each time that relay S energizes to close contacts 9s. With energization of relay J, the contacts 12j in the outgoing connections of the transmission device Ue close, so that the dial pulses transmitted after the operation of relay V are supplied immediately to the outgoing connecting circuit. Because of the arrangement whereby a delay is furnished by relay V, it is possible to provide for correction of at least the first dial pulse of a decimal series in the receiving means WU.

The above description was for the use of the system of the invention with a dial switch providing for decimal pulses. However, if the transmission device Ue is connected to a subscriber's station having keys for code dialing, the relay S will be switched off at the first dial signal by reason of interruption of the loop which is initially provided across the seized transmission device by pick up of the telephone at the subscriber's station. The code signal may also involve connection of ground potential to the "*b*" conductor, so that at the same time that the loop is interrupted, the code signal of ground to "*b*" is forwarded to the transmission device Ue. Since the relay S was energized at the first moment that a loop was formed across the seized transmission device Ue, the relay C was also energized. Therefore, the relay CA energizes over the circuit (2) when the relay S is de-energized. With energization of relay CA the voice leads *a* and *b* are connected by contacts 7a and 8a to the code signal receiver WE.

Since a code signal is at this time connected to the conductors *a* and *b*, the contacts of relays A, B, C', D complete an energizing circuit for the code detection relay CB. With energization of relay CB, and with continued energization of relay CA over a separate circuit not shown, a holding circuit for relay C is established. This circuit includes the contacts 4c, 5v, 14ca, and 15cb. The relay C may therefore remain energized throughout the depression of a key at a subscriber's station even though such depression is normally much longer than the interval between pulses in decimal pulse transmission.

The operation of relay CB also prevents the time delay relay V from operating, since the circuit (2) is thereby interrupted.

The coded dial signals transmitted by operation of the keys at the subscriber's station are picked up in the dial signal receiver WE and may be stored in the storage area W–Sp. The dial signal receiver WE can then be switched from the speaking line.

Upon completion of the reception of a dial signal in the dial signal receiver WE, relay GT is switched on through a circuit not illustrated.

At this time the conversion operation can take place, which requires operation of relays in the code converter WU. The circuit for operation of these relays is completed through the back contacts 11v, contacts 13cb, and a contact pyramid (not shown) which is formed by the contacts of relays A–D, or by the contacts of relays A1–D1. These relays permit conversion of the coded dial signals which were stored in the contact pyramid to demical pulses.

The decimal pulses may then be transmitted successively through the connecting lines, through operation of the contact 12j in a manner not shown. The first-transmitted dial signal can be sent immediately over the connecting lines, while the following dial signals must be stored and can be sent only after a previous dial signal has left the storage area. This type of system is well known and need not be further described herein.

It will be evident that the use of contact 11v to establish the coding system is not an essential feature of the invention, but rather the code relay contact 13cb may be directly connected to battery for this purpose.

It will be evident that many other changes could be made in the apparatus specifically shown in the drawing and described in this specification. The invention accordingly is not to be considered limited to the specific embodiment illustrated, but rather only by the scope of the appended claims.

We claim:

1. A connection arrangement and transmission circuit for supplying decimal signalling pulses to an outgoing telephone connection upon connection to a subscriber station and actuation there either of a switch for decimal signalling or keys for non-decimal code signalling, wherein both types of signalling employ current pulses but have distinguishing characteristics, comprising
   - a receiver circuit for response to non-decimal code signalling pulses,
   - means for supplying received decimal signalling pulses directly to the outgoing connection,
   - a circuit for connecting said receiver circuit to the line conductors from the subscriber station,
   - time delay means for interrupting said connecting circuit and actuating said supplying circuit a short time after initial signalling transmission by the subscriber station,
   - and means connected to said receiver circuit operative to recognize a non-decimal code signal during said short time and upon such recognition to prevent operation of said interrupting means.

2. The apparatus of claim 1 in which said time delay means includes a time delay relay operative only upon expiration of said short time after completion of an energizing circuit therefor,
   - an energizing circuit for the time delay relay completed upon seizure of the transmission device by the subscriber station,
   - said means connected to said receiver circuit comprising a relay having normally closed contacts in said energizing circuit but being responsive to receipt of a non-decimal code signal during said short time to open said contacts, said relay being connected to said receiver device for operation under control thereof.

3. The apparatus of claim 2 in which said connecting circuit includes contacts of a third relay,
   - an energizing circuit for the third relay including part of the energizing circuit for the time delay relay and completed therewith upon seizure of the transmission device, both said energizing circuits including normally-closed contacts of said time delay relay so that both said energizing circuits are interrupted when the time delay relay is operated, but the time delay relay having a holding circuit including normally open contacts thereof which are closed when the relay is operated to continue energization of the relay.

4. The apparatus of claim 3 in which said connecting circuit includes a line relay connected to the subscriber lines upon initial seizure of the transmission device, said line relay being energized by each completion of a loop across the subscriber lines as by pickup of a subscriber's telephone and by each subsequent completion of said loop as between decimal dialing interruptions,
   - said connecting means further including a delayed release relay operable once energized to remain operated after interruption of its energizing circuit for a time period slightly longer than the time interval between pulses of a decimal pulse series, the energizing circuit for said delayed release relay including normally open contacts in said line relay which are closed when the line relay is operated, the energizing and holding circuits for said time delay relay both including normally open contacts of said delayed release relay which are closed when the relay is operated.

References Cited

UNITED STATES PATENTS

| | | | |
|---|---|---|---|
| 3,133,155 | 5/1964 | Kuchas | 179—16 X |
| 3,259,697 | 7/1966 | Brumfield et al. | 179—16 |

WILLIAM C. COOPER, *Primary Examiner.*